May 4, 1926.
P. J. McGUIRE
1,583,299
MANUFACTURE OF SUGAR
Filed March 25, 1920
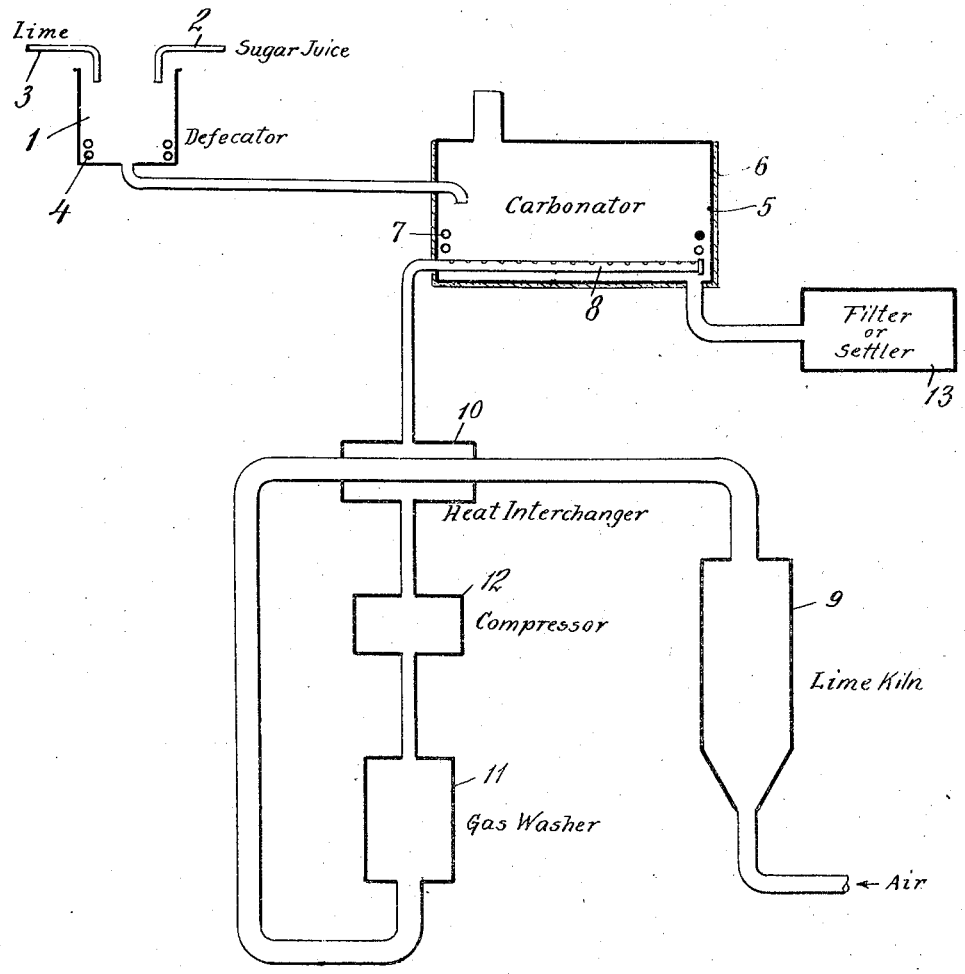

Patented May 4, 1926.

1,583,299

UNITED STATES PATENT OFFICE.

PHILIP J. McGUIRE, OF DENVER, COLORADO, ASSIGNOR TO THE DORR COMPANY, OF NEW YORK, N. Y., A CORPORATION OF DELAWARE.

MANUFACTURE OF SUGAR.

Application filed March 25, 1920. Serial No. 368,658.

*To all whom it may concern:*

Be it known that I, PHILIP J. McGUIRE, a citizen of the United States, residing at Denver, in the county of Denver, State of Colorado, have invented certain new and useful Improvements in the Manufacture of Sugar; and I do hereby declare the following to be a full, clear, and exact description of the invention, such as will enable others skilled in the art to which it appertains to make and use the same.

This invention relates to the manufacture of sugar, and is more particularly concerned with the carbonation of sugar liquors, and has for its object the provision of certain improvements in the carbonation of sugar liquors.

In the manufacture of sugar, the raw sugar juices are subjected to the action of milk of lime, or calcium saccharate, or equivalent liming agent for neutralizing the free acidity of the juices and to combine with albumen and gummy matters contained therein. This treatment of the sugar juices with an appropriate liming agent is known in the industry as the defecation operation. The limed or defecated sugar liquor is next treated with carbon-dioxide gas for neutralizing any excess of calcium hydroxide in the liquor. This treatment with carbon-dioxide gas is referred to in the industry as the carbonation operation. In the beet sugar industry, it is customary to subject the sugar liquor to two or three carbonation operations, while in the cane sugar industry it is often possible to entirely dispense with any carbonation operation. The improvements of the present invention are applicable to any of the carbonation operations at present employed in beet sugar manufacture, as well as to such carbonation operation as may be employed in cane sugar manufacture.

It has heretofore been the prevailing practice to carry out the carbonation of sugar liquors at a temperature from about 158° F. to 185° F. Thus it has been generally customary to heat sugar liquors to a temperature of about 60° C. (140° F.), and to add approximately 3% lime in the form of milk of lime, calcium saccharate, or dry lime, and to then heat the mixture to a temperature of between 78° C. and 85° C. (173° F. to 185° F.). The sugar liquor is then carbonated by bubbling carbon-dioxide gas through it. The gas reacts with the lime with the formation of a precipicate of calcium carbonate, which, together with the resulting decrease in the alkalinity or basicity of the liquor, tends to free the solution of its impurities.

It has heretofore been the general practice to introduce the carbon-dioxide gas into the carbonators at a temperature in the neighborhood of 30 to 50° C. (86 to 122° F.), and this relatively cool gas tends to cool the liquor in the carbonators. This cooling action amounts to from 9 to 18° F. under ordinary conditions, and since this drop in temperature of the sugar liquor during carbonation seriously impairs the filterability and settling properties of the resulting precipitate various expediencies have been practiced to overcome it. For example, steam coils have been placed in the carbonators, but this has proved to be a costly procedure since a scale is rapidly formed on these coils necessitating frequent cleaning, or low efficiency in heat transfer. The injection of live steam into the carbonator has also been practiced, but this tends to dilute the juices due to condensing of the steam, and the cost of subsequent evaporation of the sugar liquor is thereby materially increased.

The generally prevailing practice of overcoming the aforementioned difficulty occasioned by the introduction of relatively cool carbon dioxide gas into the sugar liquor is to pass the liquor, after the carbonation treatment, through a heater. However, I have found that this heating after carbonation does not have the same effect as heat applied during the formation of the precipitate. When conducted at the lower temperatures, the carbonation treatment results in the formation of a complex hydrosucrocarbonate compound which is precipitated in a gelatinous form. However, at higher temperatures this compound does not form. By permitting the temperature to fall during carbonation this compound forms, but upon being decomposed by subsequent heating the precipitate does not present the same physical properties as the precipitate obtained in solutions maintained at the proper temperature throughout carbonation.

I have found that by carbonating sugar liquors at a temperature of from 185° F. to 200° F. and preferably at a temperature of about 195° F., a precipitate is obtained which is granular in character as compared with the gelatinous precipitate obtained by the heretofore customary practice, and which will settle four times more rapidly than the precipitate heretofore ordinarily obtained.

I have moreover found that by carrying out the carbonation operation at the temperatures mentioned, the purity of the sugar solution is higher and its viscosity lower than in the heretofore prevailing practices, and as a result a better yield of sugar is possible in the subsequent crystallization and separation steps.

In carrying out the present invention the sugar liquor is maintained during the entire carbonation treatment at a temperature of from 185° F. to 200° F. I find that the most satisfactory results are obtained by maintaining the temperature during the carbonation at approximately 195° F. In order to maintain this desired temperature throughout the carbonation treatment, I conduct the operation in appropriately insulated apparatus, and I preheat to appropriate temperatures all of the materials entering into the reaction. Thus, in accordance with my preferred practice, the raw sugar juices are heated to a temperature of from 185° F. to 200° F., and are subjected to the action of milk of lime, calcium saccharate, or the like, which is also preferably preheated to the temperature of from 185° F. to 200° F. If desired, the raw sugar juice and the liming agent may be introduced into the defecator at various temperatures and subsequently heated to the desired temperature of from 185° F. to 200° F., the preferable temperature being about 195° F.

During the carbonation treatment the temperature of the liquor is not allowed to drop, but is maintained by the use of steam coils and appropriately heated carbon-dioxide gas at the desired temperature of from 185° F. to 200° F. throughout the entire carbonating operation. Thus, in accordance with my present invention, the carbon-dioxide gas introduced into the carbonators is heated to a temperature of from 185° F. to 200° F. and this, in conjunction with the preheating of the sugar liquor itself, the insulating of the carbonators and the supply of such additional heat as is necessary through steam coils in the carbonators, insures the maintenance of the sugar liquor at a temperature of from 185° F. to 200° F. throughout the entire carbonation treatment.

The carbon-dioxide gas is generally derived from the burning of lime stone or calcium carbonate. The carbon-dioxide gas as it leaves the lime kilns ordinarily has a temperature of about 600° F. The hot gas is passed through scrubbers in which water is used both to cool the gas and remove impurities therefrom. From the scrubbers the gas passes to compressors where it is compressed to a pressure of from three to ten pounds per square inch. In accordance with the heretofore customary practice the temperature of the gas after compression is no higher than about 125° F. In accordance with my present invention this compressed gas is conducted through a heat interchanger where it is heated to a temperature of from 185° F. to 200° F. by heat derived from hot carbon-dioxide gas direct from the lime kilns.

The novel features of the present invention which I believe to be patentable are definitely pointed out in the appended claim. In the accompanying drawing I have diagrammatically represented an arrangement of apparatus adapted for carrying out the improvements of the invention. The single figure of this drawing is in the nature of a diagrammatic flow sheet and is employed particularly for explanatory purposes, and with no intention of limiting the invention to the particular arrangement of apparatus illustrated.

Referring now to the drawing there is illustrated a defecator 1 into which the raw sugar juice and appropriate liming agent are introduced through pipes 2 and 3, respectively. Preferably, both the raw sugar juice and the liming agent are preheated to a temperature of from 195° F. to 200° F. If desired the defecator 1 may be provided with a steam heating coil 4.

The limed sugar juice heated to a temperature of from 185° F. to 200° F. is now introduced into the carbonator 5. The exposed parts of the carbonator are surrounded or covered with an appropriate heat insulating material 6, such, for example, as cork, magnesia, or the like. The carbonator is provided with a steam heating coil 7 and a gas distributor 8. The gas distributor is arranged near the bottom of the carbonator and in its simplest form consists of a pipe, or a series of pipes, or a coil of pipe, having perforations of ⅜" to ¼" for the discharge of the carbon-dioxide gas.

The carbon-dioxide gas is obtained by burning lime stone in a kiln 9. The carbon-dioxide gas ordinarily leaves the kiln 9 at a temperature of about 600° F. In accordance with my present invention the hot gases direct from the kiln 9 pass through a heat interchanger 10, where they give up some of their heat to the gas just entering the carbonator 5. After passing the heat interchanger 10, the hot carbon-dioxide gases are conveyed to a gas scrubber 11 in which water is used both for cooling the gas and for removing impurities therefrom. From the scrubber 11 the now relatively cooled gas passes to a gas compressor 12, where it is compressed to a pressure of from three to ten pounds per square inch. The compressed gas is now ready to be discharged into the carbonators, but, in accordance with the present invention, is heated to a temperature of from 185° F. to 200° F. by means of the heat interchanger 10 before entering the carbonators.

The sugar liquor in the carbonators after having been carbonated to the proper alkalinity is then pumped or permitted to flow by gravity to the filters or settlers 13 in which the precipitate and clear juice are separated and the former washed free of its sugar content. Various expediencies may be employed for separating the precipitate from the clear juice, and the apparatus designated by the reference numeral 13 in the drawing may take the form of filter presses or gravitational separators in which the desired separation is effected by a combined sedimentation and decantation operation.

Various modifications of the hereinbefore described procedure and arrangement of apparatus may be made without materially altering the results produced, and without departing from the spirit and scope of the present invention. Thus, for example, the hot water from the scrubbers may be used in an appropriate interchanger for preheating the carbon-dioxide gas prior to its introduction into the carbonators, or these gases may, if desired, be preheated by independent sources of heat. Furthermore, the gas compressor may be placed before or after the means for heating the gases, although the arrangement shown in the drawing is believed to be preferable due to the fact that the volume of gases to be handled by the compressor is smaller, and difficulties due to handling hot gases in a compressor are overcome.

The defecator 1 usually is provided with appropriate means for agitating and stirring the sugar juices and liming agent in order to bring these materials into intimate contact. In practice, the defecator as a distinct piece of apparatus, is frequently dispensed with and the mixing of the sugar juices and liming agent is carried out in the carbonators themselves.

By the practice of the invention a fast settling granular precipitate is obtained. This precipitate is peculiarly adapted for separation from the sugar juices by sedimentation and decantation. Moreover, by the practice of the invention a decrease in the amount of lime salts in the sugar juice is obtained, with a consequent increase in purity of the juice. Furthermore, the invention results in the production of a juice of lower viscosity with a consequent better yield of sugar in crystallization. The invention has a further additional advantage in that the increase in volume of gas due to the heating materially increases the surface of the gas exposed to the liquor, thereby increasing the efficiency of the gas from about 70% absorbed by the heretofore customary practice to about 75% absorbed by the method of this invention.

The chemical reaction taking place during carbonation is exothermic and the resulting heat of reaction will to a certain extent assist in maintaining the desired high temperature during carbonation. The principal losses of heat during carbonation are due to radiation and evaporation. By applying insulation to the carbonators the loss due to radiation can be effectively reduced. Such losses as inevitably occur in the carbonation operation are neutralized by applying heat to the liquor in the carbonators as, for example, by steam coils or by steam injection, as aforementioned. If desired, the carbon-dioxide gas may be heated to a higher temperature than hereinbefore specified, for example, to 215° F., thereby reducing to a minimum the amount of heating by steam coils or by steam injection necessary to maintain the liquor at the desired high temperature during the carbonation operation. As hereinbefore stated, I have found that the most satisfactory results are obtained by maintaining the sugar liquor at a temperature of about 195° F. throughout the carbonation treatment, but improved results, as compared with the results obtained by the heretofore customary practices, are secured by maintaining the sugar liquor within the range of temperatures hereinbefore specified, that is, from 185° F. to 200° F.

I claim:

In the manufacture of sugar, the improvement which comprises the steps of subjecting sugar juices to the action of a liming agent at a temperature of from 185° F. to 200° F. and subjecting the limed liquor while maintained at a temperature of from 185° F. to 200° F. to the action of carbon-dioxide gas of a temperature of from 185° F. to 215° F.; substantially as described.

In testimony whereof I affix my signature.

PHILIP J. McGUIRE.